United States Patent
Hu et al.

(10) Patent No.: US 10,638,147 B2
(45) Date of Patent: Apr. 28, 2020

(54) GRADUAL DECODER REFRESH TECHNIQUES WITH MANAGEMENT OF REFERENCE PICTURES

(71) Applicant: Apple Inc., Cupertino, CA (US)

(72) Inventors: Sudeng Hu, San Jose, CA (US); Dazhong Zhang, Milpitas, CA (US); Xing Wen, Cupertino, CA (US); Peikang Song, San Jose, CA (US); Jae Hoon Kim, San Jose, CA (US); Hang Yuan, San Jose, CA (US); Xiaosong Zhou, Campbell, CA (US); Hsi-Jung Wu, San Jose, CA (US); Jingteng Xue, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 40 days.

(21) Appl. No.: 15/995,868

(22) Filed: Jun. 1, 2018

(65) Prior Publication Data
US 2019/0373276 A1 Dec. 5, 2019

(51) Int. Cl.
*H04N 19/46* (2014.01)
*H04N 19/159* (2014.01)
*H04N 19/172* (2014.01)
*H04N 19/44* (2014.01)

(52) U.S. Cl.
CPC ........... *H04N 19/46* (2014.11); *H04N 19/159* (2014.11); *H04N 19/172* (2014.11); *H04N 19/44* (2014.11)

(58) Field of Classification Search
CPC .... H04N 19/46; H04N 19/159; H04N 19/172; H04N 19/44
USPC ...................................... 375/240.02
See application file for complete search history.

(56) References Cited

U.S. PATENT DOCUMENTS

| | | | |
|---|---|---|---|
| 2013/0132510 A1* | 5/2013 | Ye | H04N 21/226 709/217 |
| 2014/0092997 A1* | 4/2014 | Zhou | H04N 19/44 375/240.27 |
| 2014/0301464 A1* | 10/2014 | Wu | H04N 19/105 375/240.15 |
| 2016/0350930 A1* | 12/2016 | Lin | G06K 9/66 |

* cited by examiner

*Primary Examiner* — Patricia I Young
(74) *Attorney, Agent, or Firm* — BakerHostetler

(57) ABSTRACT

Techniques are disclosed for managing reference frames for gradual coder refresh (GDR) operation. A GDR frame may be partitioned into a plurality of units, at least one of which is coded by instantaneous decoder refresh (IDR) techniques and other(s) of which are coded by other techniques such as inter-coding. The coded GDR frame may be exchanged between an encoder and a decoder. The encoder and decoder both may decode the GDR frame. The encoder and decoder may store the IDR-coded portion of the GDR frame in a reference picture buffer in a modified frame that includes, for the other portion(s) of the GDR frame, replacement content instead of the content obtained by decoding. The modified reference frame are expected by bias prediction search operations performed on later frame toward selection of the IDR-coded content as opposed to the replacement content.

40 Claims, 7 Drawing Sheets

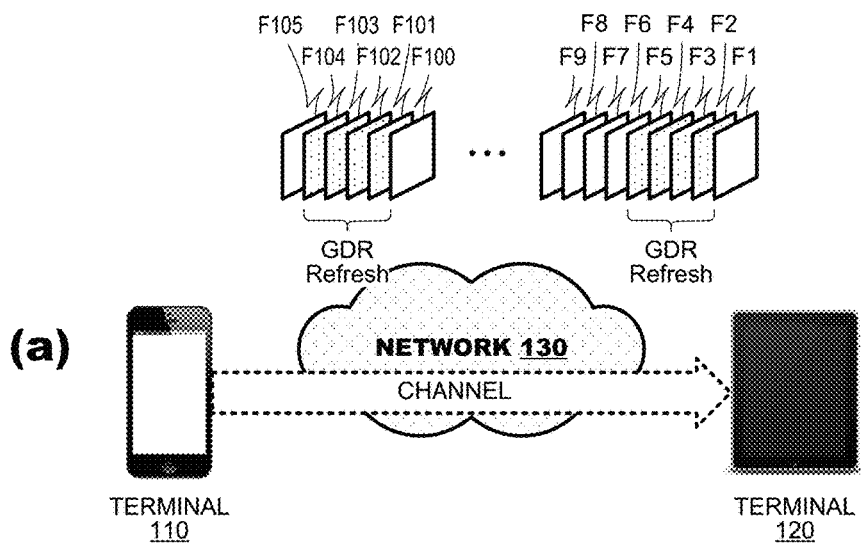
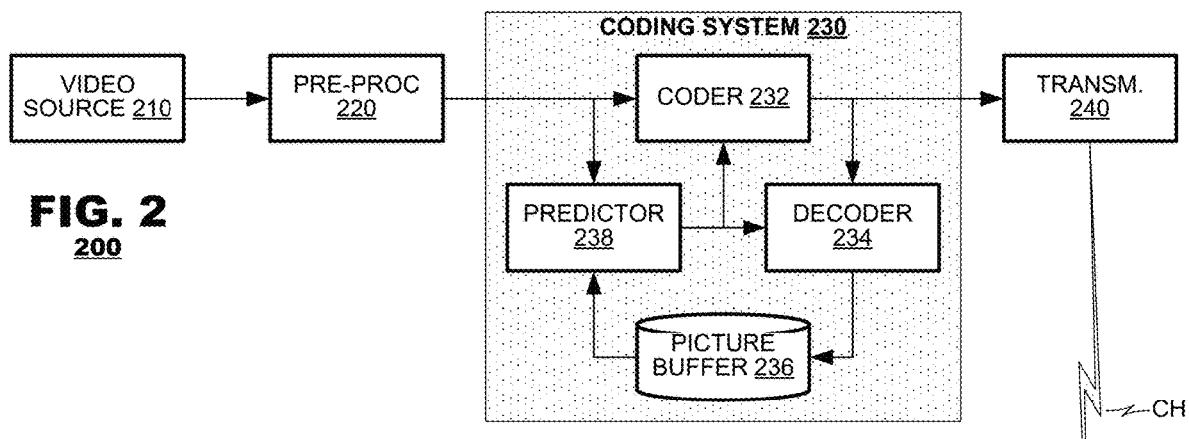
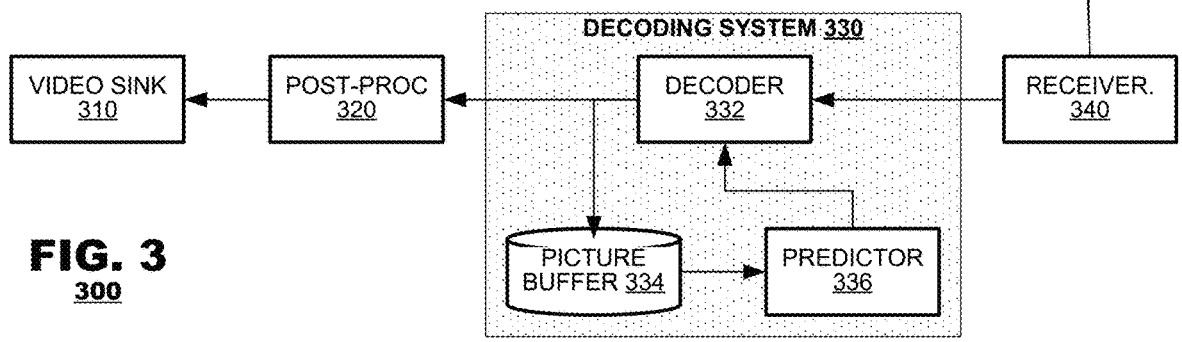

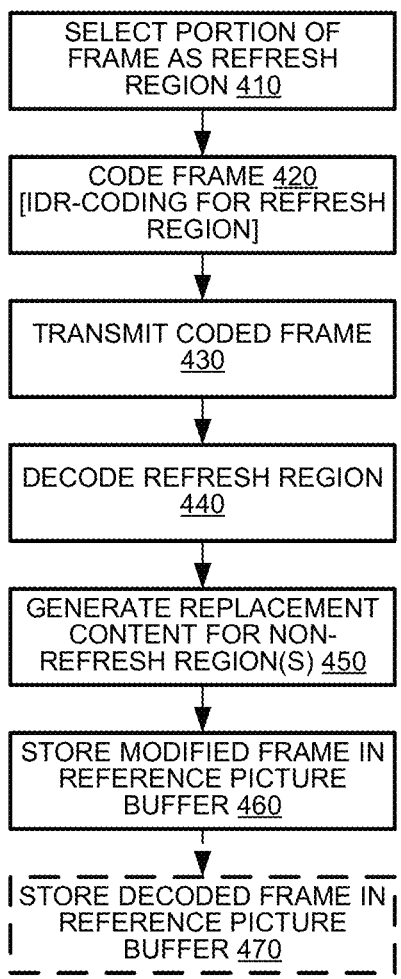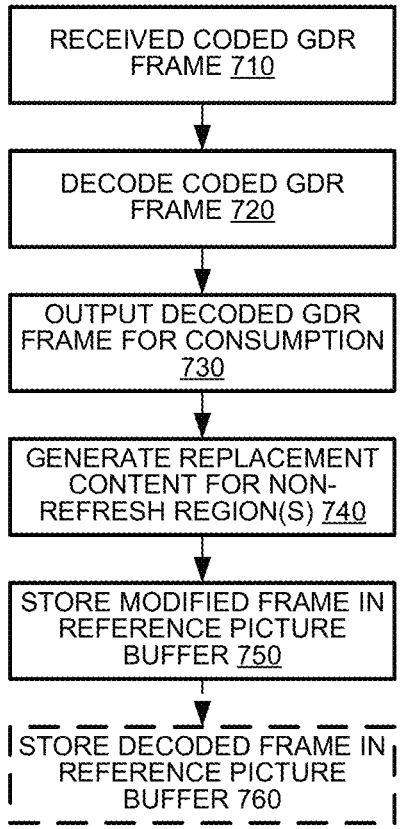

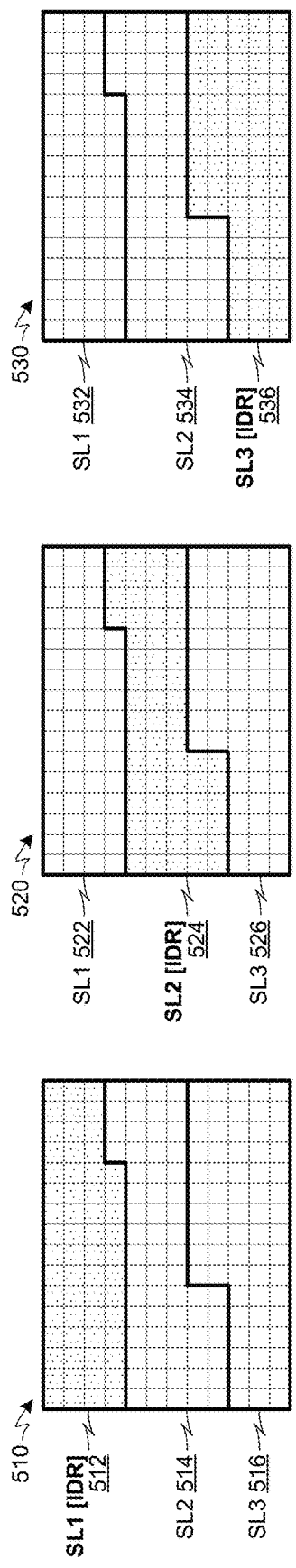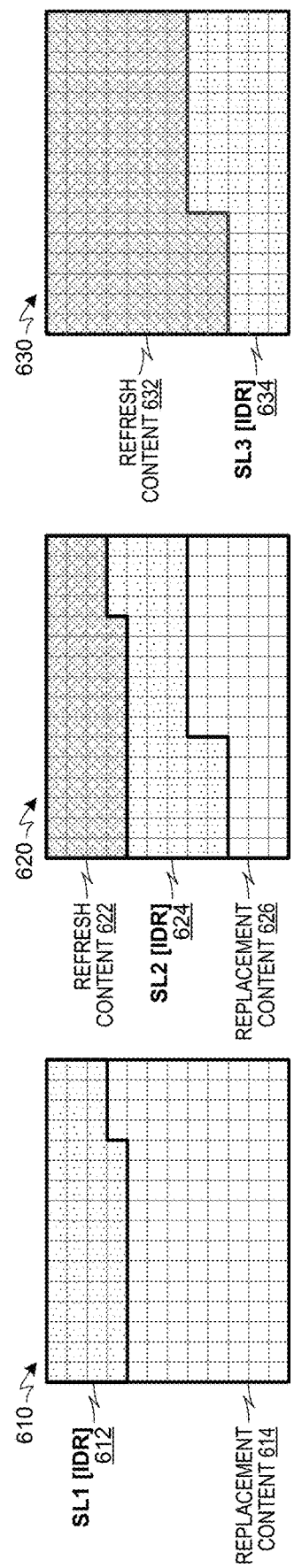

800

900

1000

1300

1400

1500

GRADUAL DECODER REFRESH TECHNIQUES WITH MANAGEMENT OF REFERENCE PICTURES

BACKGROUND

The present disclosure refers to video coding and compression techniques.

Many modern electronic devices employ video coding to support exchange of video. Video coding employs a variety coding techniques to exploit spatial and/or temporal redundancy in a video sequence and to achieve bandwidth compression. For example, spatial redundancy may be exploited by coding a first unit of image data from a first frame of an input video sequence differentially with respect to another, previously-coded unit of image data from the same frame. Temporal redundancy may be exploited by coding a unit of image data from a first frame differentially with respect to a unit of image data from another previously-coded frame. In either case, differentially coding the new unit of image data with respect to the previously-coded unit of image data (the new unit's "prediction reference") achieves bandwidth compression. Additional coding operations, such as quantization and entropy coding, may be layered upon the predictive coding to achieve additional compression.

Coding image data with respect to prediction references has its consequences. For example, when operational errors such as packet loss arise, they can have consequences across multiple frames of video. For example, if a coded frame were designated as a prediction reference and were lost due to an operational error, not only would the prediction reference be lost but other frames, which refer to the lost prediction reference, could not be recovered. Accordingly, many video coding protocols employ error resiliency protocols to mitigate losses in the event of operational errors.

BRIEF DESCRIPTION OF THE DRAWINGS

FIG. 1 illustrates a video coding system according to an aspect of the present disclosure.

FIG. 2 is a functional block diagram illustrating components of a coding terminal according to an aspect of the present disclosure.

FIG. 3 is a functional block diagram illustrating components of a decoding terminal according to an aspect of the present disclosure.

FIG. 4 illustrates a method for coding and managing use of GDR frames as prediction references according to an aspect of the present disclosure.

FIGS. 5 and 6 illustrate exemplary picture data that may be processed by aspects of the present disclosure.

FIG. 7 illustrates a method for coding and managing use of GDR frames as prediction references according to an aspect of the present disclosure.

DETAILED DESCRIPTION

Figure 8:
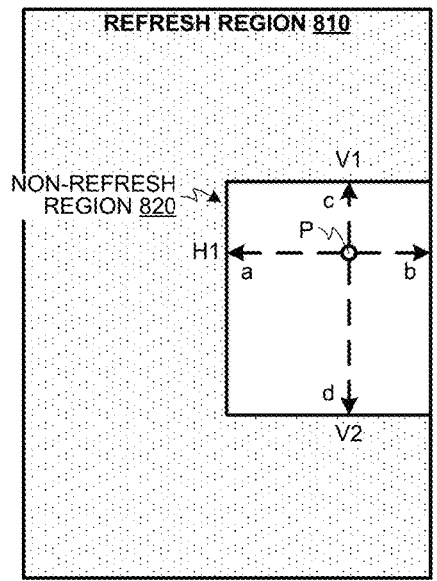
FIGS. 8 and 9 each illustrate derivation techniques according to aspects of the present disclosure.

The present disclosure describes techniques for managing reference frames for refresh operations. According to such techniques, a Gradual Decoder Refresh ("GDR") frame may be partitioned into a plurality of units, at least one of which is coded by Instantaneous Decoder Refresh ("IDR") techniques and other(s) of which are coded by other techniques. An IDR-coded region is "refreshed" by causing them to be synchronized between an encoder and a decoder. Moreover, regions that are coded using the IDR-coded region as a prediction reference, either directly or indirectly, also are considered refreshed. When reference pictures are to be stored as prediction references for other content, non-refreshed portions of the frame may have replacement content generated for them. Modifying reference frames is expected by bias prediction search operations performed on later frame toward selection of the IDR-coded content as opposed to the replacement content.

FIG. 1 illustrates a video coding system 100 according to an aspect of the present disclosure. The system 100 may include a pair of terminals 110, 120 provided in communication via a network 130. A first terminal 110 may code video data for bandwidth compression and deliver the coded video data to the terminal 120 via the network 130. The terminal 120 may decode the coded video data and consume video data recovered therefrom. Typically, the recovered video data is displayed or stored. In some use cases, the recovered video data may be processed by an application executing on the terminal 120.

During operation, a coding terminal 110 may generate coded frames F1-F105 and transmit them to a decoding terminal 120 in succession. Certain frames may be coded as GDR frames, and they may possess IDR-coded content in designated regions of each frame. Typically, GDR refresh frames would be generated at predetermined intervals during a coding session, for example, once per second, once per 5 second interval, or the like. Thus, FIG. 1 illustrates a first plurality of GDR frames F2-F5 transmitted as a first interval, then a second set of GDR frames F101-F104 transmitted in a second interval. When a GDR refresh operation is to be conducted, a sequence of GDR frames may be generated that, in aggregate, cause a refresh to all spatial areas of frame.

Although the GDR frames F2-F5 and F101-F104 are illustrated as being transmitted consecutively in each GDR refresh interval, they need not be transmitted in such a manner. For example, non-GDR refresh frames may be generated between adjacent GDR frames F2, F3; doing so may spread the increased bit rate associated with GDR coding over a longer span of time than would occur if all GDR frames F2-F5 were transmitted consecutively.

FIG. 2 is a functional block diagram illustrating components of a coding terminal 200 according to an aspect of the present disclosure. The coding terminal 200 may include a video source 210, an image pre-processor 220, a coding system 230, and a transmitter 240. The video source 210 may supply video to be coded. The video source 210 may be provided as a camera that captures image data of a local environment, a storage device that stores video from some other source, an application executing on the coding terminal 200, or a network connection through which source video data is received. The image pre-processor 220 may perform signal conditioning operations on the video to be coded to prepare the video data for coding. For example, the preprocessor 220 alter the frame rate, frame resolution, and/or other properties of the source video. The image pre-processor 220 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field frames are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;

single prediction inter-coding, in which an input pixel block is coded differentially with respect to data of a previously coded/decoded frame; and multi-hypothesis motion compensation predictive coding, in which an input pixel block is coded predictively using decoded data from two or more sources, via temporal or spatial predication.

The predictive coding modes may be used cooperatively with other coding techniques, such as Transform Skip coding, RRU coding, scaling of prediction sources, palette coding, and the like.

The coding system 230 may include a forward coder 232, a decoder 233, an in-loop filter 234, a picture buffer 235, and a predictor 236. The coder 232 may apply the differential coding techniques to the input pixel block using predicted pixel block data supplied by the predictor 236. The decoder 233 may invert the differential coding techniques applied by the coder 232 to a subset of coded frames designated as reference frames. The in-loop filter 234 may apply filtering techniques to the reconstructed reference frames generated by the decoder 233. The picture buffer 235 may store the reconstructed reference frames for use in prediction operations. The predictor 236 may predict data for input pixel blocks from within the reference frames stored in the picture buffer. The coding system 230 typically operates according to a predetermined coding protocol such as the ITU-T's H.265 (commonly known as "HEVC"), H.264 ("AVC") or H.263 coding protocol.

The transmitter 240 may transmit coded video data to a decoding terminal via a channel CH.

FIG. 3 is a functional block diagram illustrating components of a decoding terminal 300 according to an aspect of the present disclosure. The decoding terminal 300 may include a receiver 310 to receive coded video data from the channel, a video decoding system 320 that decodes coded data, a post-processor 330, and a video sink 340 that consumes the video data.

The receiver 310 may receive a data stream from the network and may route components of the data stream to appropriate units within the terminal 300. Although FIGS. 2 and 3 illustrate functional units for video coding and decoding, terminals 110, 120 (FIG. 1) often will include coding/decoding systems for audio data associated with the video and perhaps other processing units (not shown). Thus, the receiver 310 may parse the coded video data from other elements of the data stream and route it to the video decoder 320.

The video decoder 320 may perform decoding operations that invert coding operations performed by the coding system 150. The video decoder 320 may include a decoder 322, an in-loop filter 324, a picture buffer 326, and a predictor 328. The decoder 322 may invert the differential coding techniques applied by the coder 232 to the coded frames. The in-loop filter 324 may apply filtering techniques to reconstructed frame data generated by the decoder 322. For example, the in-loop filter 324 may perform various filtering operations (e.g., de-blocking, de-ringing filtering, sample adaptive offset processing, and the like). The filtered frame data may be output from the decoding system. The picture buffer 326 may store reconstructed reference frames for use in prediction operations. The predictor 328 may predict data for input pixel blocks from within the reference frames stored by the picture buffer 326 according to prediction reference data provided in the coded video data. The video decoder 320 may operate according to the same coding protocol as the encoder, for example, the ITU-T's H.265 (commonly known as "HEVC"), H.264 ("AVC") or H.263 coding protocol.

The post-processor 330 may perform operations to condition the reconstructed video data for display. For example, the post-processor 330 may perform various filtering operations (e.g., de-blocking, de-ringing filtering, and the like), which may obscure visual artifacts in output video that are generated by the coding/decoding process. The post-processor 330 also may alter resolution, frame rate, color space, etc. of the reconstructed video to conform it to requirements of the video sink 340.

The video sink 340 represents various hardware and/or software components in a decoding terminal that may consume the reconstructed video. The video sink 340 typically may include one or more display devices on which reconstructed video may be rendered. Alternatively, the video sink 340 may be represented by a memory system that stores the reconstructed video for later use. The video sink 340 also may include one or more application programs that process the reconstructed video data according to controls provided in the application program. In some aspects, the video sink may represent a transmission system that transmits the reconstructed video to a display on another device, separate from the decoding terminal; for example, reconstructed video generated by a notebook computer may be transmitted to a large flat panel display for viewing.

The foregoing discussion of the encoding terminal and the decoding terminal (FIGS. 2 and 3) illustrates operations that are performed to code and decode video data in a single direction between terminals, such as from terminal 110 to terminal 120 (FIG. 1). In applications where bidirectional exchange of video is to be performed between the terminals 110, 120, each terminal 110, 120 will possess the functional units associated with an encoding terminal (FIG. 2) and each terminal 110, 120 will possess the functional units associated with a decoding terminal (FIG. 3). Indeed, in certain applications, terminals 110, 120 may exchange multiple streams of coded video in a single direction, in which case, a single terminal (say terminal 110) will have multiple instances of an encoding terminal (FIG. 2) provided therein. Such implementations are fully consistent with the present discussion.

FIG. 4 illustrates a method 400 for processing GDR frames according to an aspect of the present disclosure. The method 400 may work cooperatively with other coding techniques, such as coding techniques that are to be applied to non-GDR frames. The method 400 may be triggered when an encoder determines to code a frame as a GDR frame. The method 400 may select portion(s) of an input frame as an IDR region (box 410) then code the frame (box 420). Image data contained within the IDR region(s) may be coded according to IDR-coding techniques, whereas image data contained in the region(s) outside the IDR region may be coded according to default coding policies. Typically, the default policies would involve coding the image data in the non-IDR region(s) according to inter-coding techniques that achieve higher bandwidth conservation than IDR coding. Once the frame is coded, the method 400 may transmit the coded frame to a channel (box 430).

The method 400 also may decode the refresh region(s) of the GDR frame (box 440). The refresh regions may include the IDR-coded region of the GDR frame and any regions that were refreshed by earlier-coded GDR frames in a current GDR interval. The method 400 may generate replacement content for non-refresh regions of the frame (box 450) and store the modified GDR frame in a reference picture buffer (box 460). The modified frame may serve as a prediction reference for subsequently-coded frames.

FIGS. 5 and 6 illustrate application of the method 400 to a sequence of exemplary frames 510-530 that are to be coded in sequence according to GDR techniques. As illustrated in FIG. 5, each of the GDR frames 510-530 are shown as partitioned into a common set of three slices SL1-SL3. The SL1 slice 512 of frame 510, the SL2 slice 524 of frame 520, and the SL3 slice 536 of frame 530 are designated for coding by IDR coding. In aggregate, these slices 512, 524, 536 refresh a video sequence over a GDR refresh interval (FIG. 1). Thus, when these frames 510-530 are coded as per box 420 of FIG. 4, image data in these slices will be coded by IDR-coding techniques. The remaining regions—slices SL2 and SL3 of frame 510, slices SL1 and SL3 of frame 520, and SL1 and SL2 of frame 530—may be coded according to non-IDR policies (typically, inter-coding techniques). The coded frames 510-530 may be transmitted to a decoder.

In the example of FIG. 5, the slices 512, 524, 536 of frames 510-530 refresh a video sequence over a GDR refresh interval (FIG. 1). When slice 512 of frame 510 is coded by IDR coding, the IDR coding refreshes coding of the video sequence corresponding to that region. Similarly, when slice 524 of frame 520 is coded by IDR coding, the IDR coding refreshes coding of the video sequence corresponding to that region. Moreover, slice 522 of frame 520 will be considered refreshed due the presence of the IDR-coded slice 512 from frame 510. Similarly, the IDR-coded slice 536 of frame 530 causes slice SL3 to be refreshed, and slices 532, 534 will be considered refreshed due to the presents of the IDR-coded slices 512 and 524 from frames 510, 520. In this example, the coding of frame 530 completes the GDR refresh interval.

When the operations of boxes 450-460 are performed on the frames 510-530, they may yield modified frames 610-630 as shown in FIG. 6. As illustrated, the IDR-coded slices of the frames 510-530 may be decoded, which yields decoded content for those slices 612, 624 and 634. Specifically, the IDR-coded slice 512 of frame 510 may yield decoded data of a slice SL1 in frame 610, and it refreshes content in that region. Replacement content 614 may be generated for the remainder of frame 610 since it will not yet have been refreshed in the GDR refresh interval.

Similarly, the IDR-coded slice 524 of frame 520 may yield decoded data of a slice 624 in frame 620, and it refreshes content in that region. Content of slice 622 also will be considered refreshed because it depends on content from a refreshed region (slice 612) of another frame 610 in the GDR interval. Slice SL3 of frame 620 is shown as not refreshed in this example. Replacement content 626 may be generated for this portion of frame 620.

With respect to frame 630, the IDR-coded slice 534 of frame 530 may yielded decoded data of a slice 634 in frame 630. Content of other slices SL1, SL2 of frame 630 may be considered refreshed because they were refreshed by IDR-coded data 512, 522 of other frames 510, 520. The entirety of frame 630 is considered refreshed.

Application of the method 400 of FIG. 4 is expected to provide error resiliency in video coding applications by terminating effects that may arise from communication errors between an encoding terminal and a decoding terminal. Communication errors often create coding artifacts because, if a first coded frame is lost due to communication errors, then a decoding terminal loses access not only to the first frame but also to other frames whose decoding depends on the lost frame. When GDR frames are received and decoded, then synchronization between an encoder and a decoder will be restored with respect to each GDR frame. The encoder and decoder will store identical content of frames 610-630, absent other communication errors.

A decoding terminal also may decode coded data of the non-refreshed regions of each frame. As illustrated in FIG. 5, slices 514 and 516 of frame 510 are coded at an encoding terminal 510 even though they are not refreshed. Coded content of the slices 514 and 516 also would be decoded by a decoding terminal and displayed (not shown in FIG. 6). The replacement content 614 of frame 610 would replace the decoded content of slices SL2 and SL3 when the frame is stored for use as a prediction reference during later decoding.

It is expected that, when replacement content generated for decoded frames and those frames are stored for use as prediction references, the replacement content 614, 626 of the frames 610, 620 will become poor prediction sources for later-coded frames. Although permissible, prediction search algorithms likely will not select the replacement content 614, 626 of the frames 610, 620 in favor of other prediction sources (perhaps from regions 612, 622, 624 of frames 610, 620 or perhaps from other stored reference frames that are not shown in FIGS. 5 and 6). Thus, the foregoing techniques are expected to work cooperatively with prediction search algorithms to bias prediction selection toward refreshed portions of reference frames.

FIG. 7 illustrates a method 700 of decoding coded GDR frame data according to an aspect of the present disclosure. The method 700 may receive a GDR-coded frame (box 710) decode it (box 720), and output the decoded frame for consumption by other processes (box 730). The method 700 may generate replacement content for non-refresh regions of the frame (box 740) and store the modified GDR frame in a reference picture buffer (box 750) at a decoder. The modified frame may serve as a prediction reference for subsequently-decoded frames.

The operations of methods 400 (FIG. 4) and 700 (FIG. 7) may work cooperatively to code GDR frames at a video coder (FIG. 2), transmit the coded frames to a decoder (FIG. 3), and decode them. When the methods 400 and 700 are applied to a common video sequence, the methods should generate synchronized modified reference frames at picture buffers of the encoder and decoder, in the absence of operational errors. A variety of techniques are available to generate replacement content, so long as an encoder and its counterpart decoder employ the same techniques.

In one aspect, replacement content may be generated having fixed values of image content (e.g., 0, 128, 255, etc.).

Figure 9:
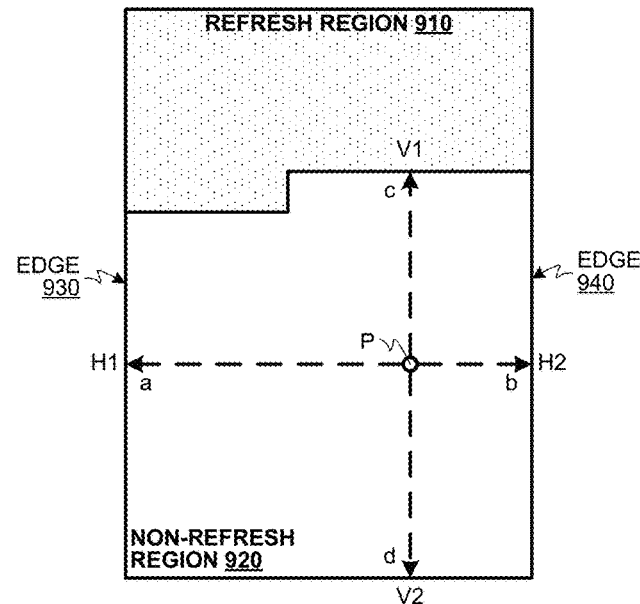

In another aspect, an intra-picture recovery technique may be used. For example, replacement content of a non-refresh region may be derived from pixel values located along a boundary of the non-refresh region. FIGS. 8 and 9 illustrate operation of one such derivation technique. There, content of a pixel P may be derived from pixel values H1, H2, V1 and V2 at located at borders of the refresh region 810 to the left, right, top and bottom of the pixel P. For example, the pixel's value PV may be derived as:

$$P_V = \frac{a \cdot H1 + b \cdot H2 + c \cdot V1 + d \cdot V2}{a + b + c + d},$$

where a, b, c, and d respectively represent the distances of the refresh region pixels H1, H2, V1 and V2 from the pixel Pv.

It may occur that pixels from refresh regions will not be available in all directions about a pixel P that is to be derived. In the example of FIG. 8, there is no refresh region data between the pixel P and a right edge of an image. In the example of FIG. 9, there is no refresh region data between the pixel P and the left edge, right edge and bottom edge of an image. In such cases, pixel derivation techniques may be performed as follows:

In one aspect, if refresh region content is unavailable in a first direction (say, to the right of pixel P in the example of FIG. 8), the "missing" pixel value (H2) may be set to the value of its counterpart pixel H1 in an opposite direction.

In another aspect, if refresh region content is unavailable in either direction of a pixel (e.g., as in FIG. 9, no refresh region data exists both in the left and right directions about a pixel P, or there is no refresh region data both above and below the pixel P), distance values for the missing pixels H1, H2 may be set to zero (e.g., a=0, b=0 in the example of FIG. 9).

In a further aspect, if refresh region content is unavailable on all directions about a pixel P, the pixel's value may be set to a predetermined value (e.g., 0, 128, 255 or an average value of all pixels in the refresh region).

In another aspect, replacement content of a non-refresh region may be derived from content of frames that are known to be good at both an encoder and a decoder. For example, many coding protocols employ techniques that cause decoders to acknowledge successful receipt and decoding of designated frames (called "acknowledged frames" for convenience). Other coding protocols employ techniques that cause decoders to store designated reference frames until they receive signaling from an encoder that the reference frame will no longer be used for coding (called "long term reference frames"). In such a case, replacement content for a given GDR frame may be derived from a most-recently received acknowledged frame or most-recently received long term reference frame.

In a further aspect, replacement content of a non-refresh region may be predicted from content available in a picture buffer using a machine learning algorithm. For example, a recurrent neural network (RNN) can be used. The RNN may be defined initially according to a set of network weights that are predefined at an encoder and a decoder. In such applications, frames stored in a picture buffer may represent a sequence of pictures, and a sliding window with size N is used. The first N−1 pictures in the window may represent input to the RNN, and the last picture is used as a desired output. The RNN may be retrained as the window moves forward. The training may update the initial set of RNN weights from which to predict content of the unrefreshed region.

In the discussion of the methods 400 and 700 of FIGS. 4 and 7, modified reference frames consisting of reconstructed IDR-coded data and replacement content are generated and stored in the picture buffers of encoders and decoders. During coding, when an encoder searches for prediction references from among a GDR frame, it is expected that non-refresh regions are less likely to be identified as a prediction match for new content.

Figure 10:
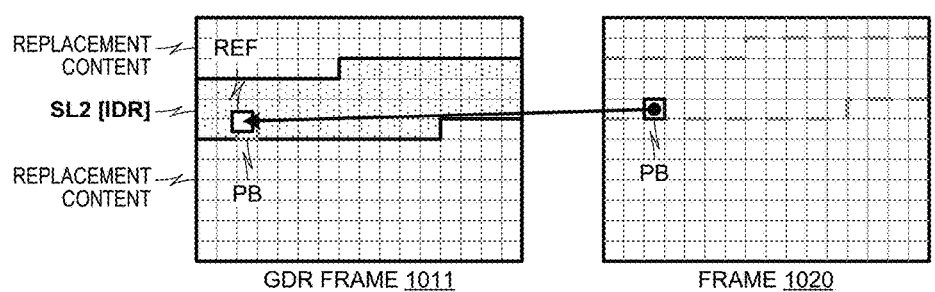
FIG. 10 illustrates exemplary prediction operations for use with aspects of the present disclosure.

FIG. 10 illustrates an example of the expected phenomenon. There, a first GDR frame 1010 is available that contains decoded IDR content and replacement content. When an encoder codes a pixel block PB of new input frame 1020, the encoder will search for a content match between the pixel block and data of the GDR frame. The search will not be constrained to the IDR content of the GDR frame 1010. It also may consider the replacement content as a candidate prediction match. Owing to the presence of replacement content, it is expected that the likelihood that the replacement content will be identified as a prediction match will be lowered as compared to the likelihood that other content from the refresh region will be identified as a prediction match. Thus, it is expected that modifications of GDR frames will bias the prediction search processes to favor refresh content over non-refresh content in such frames.

Returning to FIGS. 4 and 7, in another aspect, the methods 400 and 700 each may store decoded frames in a reference picture buffer (boxes 470, 760) in addition to storing modified frames. In this manner, each coded GDR frame may result in a pair of reference pictures being stored in a picture buffer, one that has replacement content in it and one that does not. Each reference picture may possess its own picture identifier (often expressed as a ref index in coding protocols). Thus, when coding a new frame, an encoder has an option of using a modified GDR frame as a prediction reference or using a decoded GDR frame, one without modification, as a prediction reference.

Figure 11:
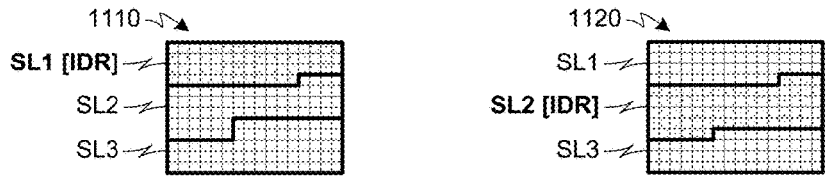
FIG. 11 illustrates exemplary frame data that may be processed by aspects of the present disclosure.
Figure 12:
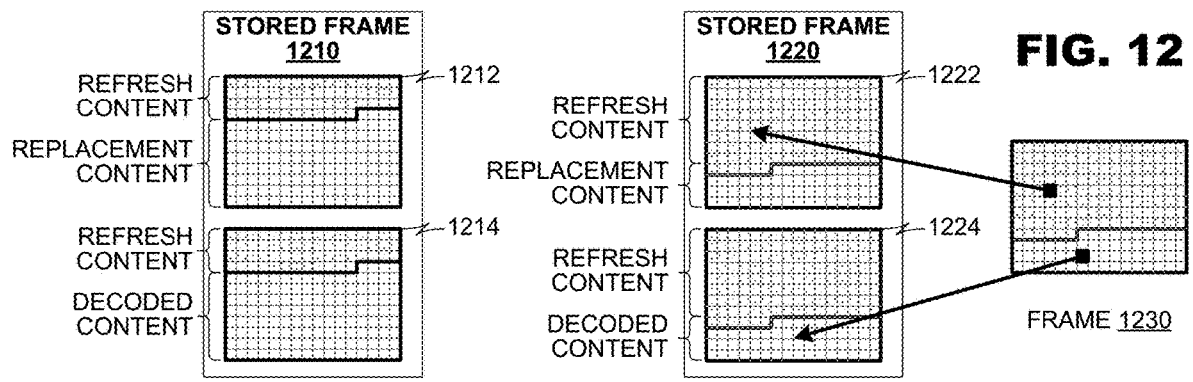
FIG. 12 illustrates exemplary reference picture data that may be obtained by aspects of the present disclosure.

In another aspect, picture buffers may store both a modified GDR frame and an unmodified GDR frame. FIGS. 11 and 12 illustrate one possible implementation of this technique. FIG. 11 illustrates two GDR frames 1110, 1120, in which slice SL1 of frame 1110 is IDR-coded and slice SL2 of frame 1120 is IDR-coded. FIG. 12 illustrates frames 1210, 1220 that may be stored in picture buffers of coding and decoding terminals after the GDR frames 1110, 1120 are decoded.

In the aspect illustrated in FIG. 12, each "frame" 1210, 1220 stored in the picture buffers may be a composite formed from both a modified frame and a decoded frame. A first portion 1212, 1222 of each frame 1210, 1220 may contain data of a modified GDR frame generated according to boxes 450, 740 of methods 400, 700 (FIGS. 4, 7). A second portion 1214, 1224 of each frame may contain data of the decoded GDR frame without modification. Thus, the composite frames 1210, 1220 may contain the data of two frames.

When a new frame 1230 is to be coded, pixel blocks may be coded with respect to one of the sub-frames 1222, 1224 in a composite frame 1220 that serves as a prediction reference. For example, a sub-frame 1222 with replacement content may be used as a candidate prediction reference for a pixel block PB1 in a region of the frame 1230 that has been refreshed. A sub-frame 1224 that does not have replacement content may be used as a candidate prediction reference for a pixel block PB2 in a region of the frame 1230 that has not been refreshed.

In the example illustrated in FIG. 12 the modified frames 1212, 1222 are illustrated as having replacement content for all regions of the frame that have been refreshed by a preceding GDR frame. Thus, although frame 1120 (FIG. 11) is illustrated as having IDR-coded content only in slice SL2, the slice SL1 of frame 1120 in this example is predicted from the IDR-coded slice SL1 of frame 1110 and, therefore, is considered refreshed. Thus, sub-frame 1222, which corresponds to the modified frame generated in boxes 450, 740 of methods 400, 700 (FIGS. 4, 7), may be treated as having refresh content in a region corresponding to slices SL1 and SL2 of frame 1120.

Figure 13:
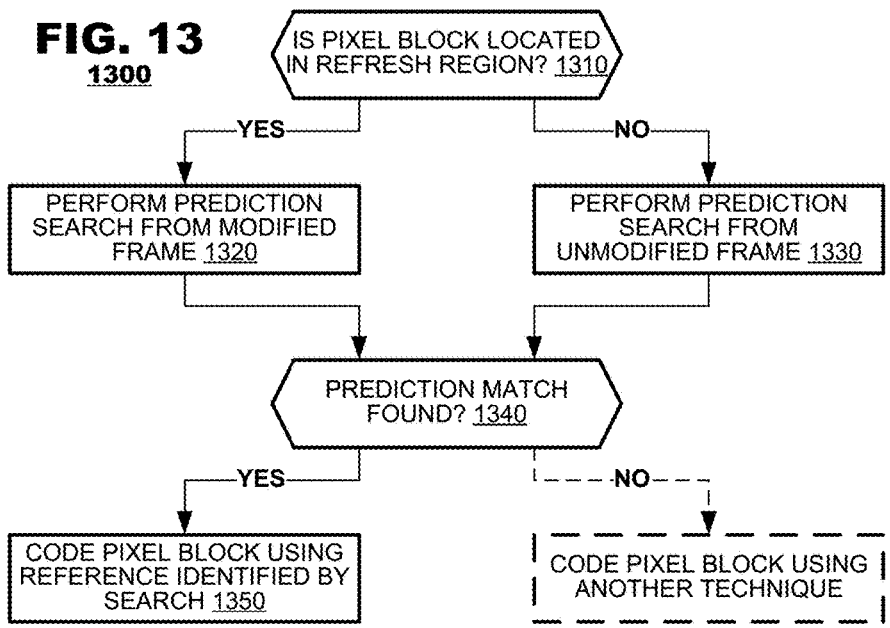
FIG. 13 illustrates a method for coding a pixel block for a new frame according to an aspect of the present disclosure.

FIG. 13 illustrates a method 1300 for coding a pixel block for a new frame according to an aspect of the present disclosure. The method 1300 may determine whether the pixel block is located in a refresh region of its frame (box 1310). If so, the method 1300 may perform a prediction search for the pixel block using a modified frame component (e.g., component 1222 of FIG. 12) of a composite picture buffered in a picture buffer (box 1320). If not, the method 1300 may perform a prediction search for the pixel block using a non-modified frame component (e.g., component 1224 of FIG. 12) of a composite picture buffered in a picture buffer (box 1330). In either case, the method 1300 may determine if a prediction match was found (box 1340). If so, the method 1300 may code the pixel block using the prediction reference identified by the prediction search (box 1350).

The method 1300 may work cooperatively with other coding techniques. It is possible that no match would be found using the prediction searches of boxes 1320 or 1330. In such cases, the method 1300 may cause the pixel block to be coded by some other technique, such as by inter-coding using another frame as a prediction reference or by intra-coding.

Figure 14:
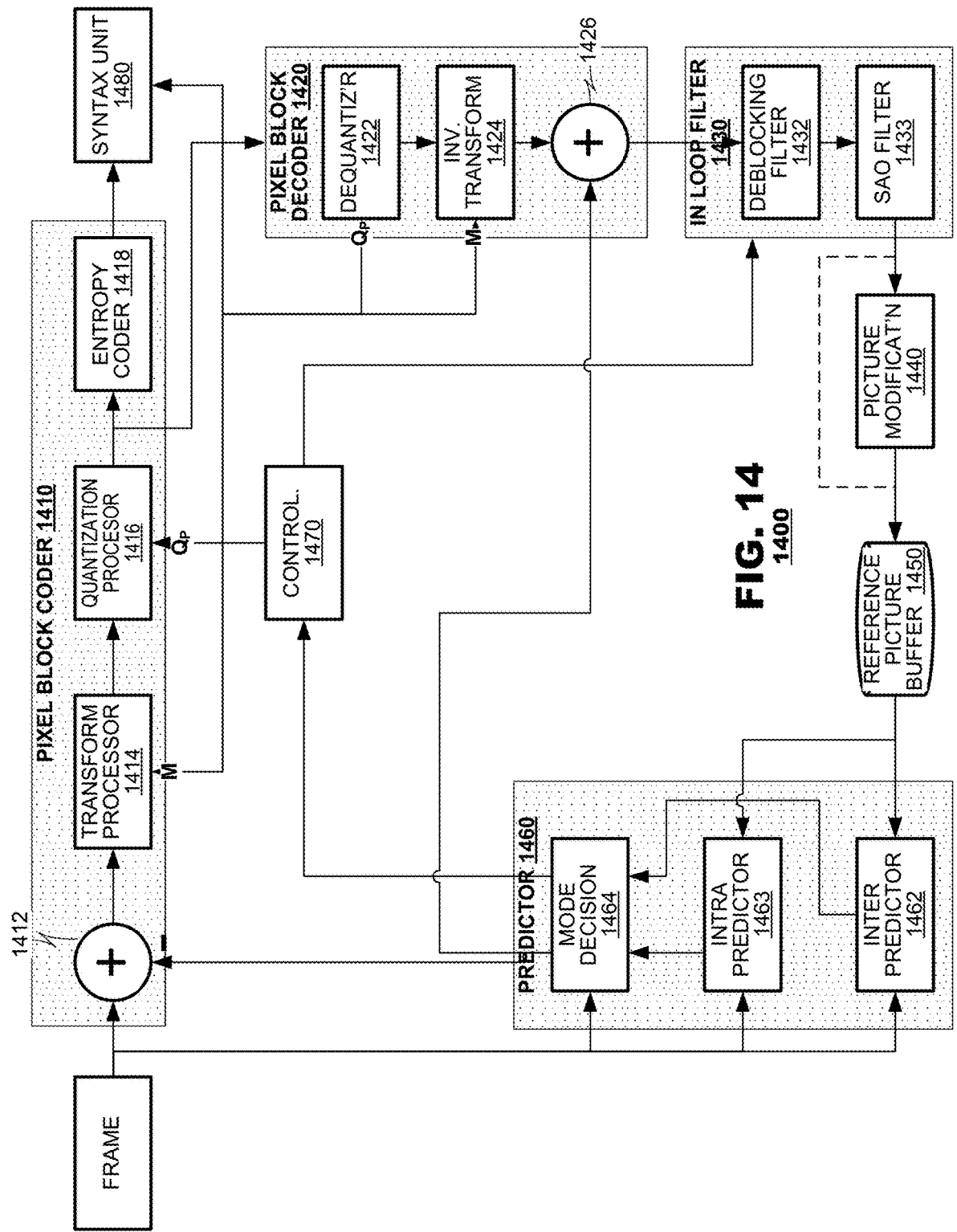
FIG. 14 is a functional block diagram of a coding system according to an aspect of the present disclosure.

FIG. 14 is a functional block diagram of a coding system 1400 according to an aspect of the present disclosure. The system 1400 may include a pixel block coder 1410, a pixel block decoder 1420, an in-loop filter system 1430, reference picture modification unit 1450, a reference picture buffer 1450, a predictor 1460, a controller 1470, and a syntax unit 1480. The predictor 1460 may predict image data for use during coding of a newly-presented input pixel block and it may supply a prediction block representing the predicted image data to the pixel block coder 1410. The pixel block coder 1410 may code the new pixel block by predictive coding techniques and present coded pixel block data to the syntax unit 1480. The pixel block decoder 1420 may decode the coded pixel block data, generating decoded pixel block data therefrom. The in-loop filter 1430 may perform one or more filtering operations on the reconstructed frame. The reference picture buffer 1450 may store the filtered frame, where it may be used as a source of prediction of later-received pixel blocks. The syntax unit 1480 may assemble a data stream from the coded pixel block data, which conforms to a governing coding protocol.

The pixel block coder 1410 may include a subtractor 1412, a transform unit 1414, a quantizer 1416, and an entropy coder 1418. The pixel block coder 1410 may accept pixel blocks of input data at the subtractor 1412. The subtractor 1412 may receive predicted pixel blocks from the predictor 1460 and generate an array of pixel residuals therefrom representing a difference between the input pixel block and the predicted pixel block. The transform unit 1414 may apply a transform to the sample data output from the subtractor 1412, to convert data from the pixel domain to a domain of transform coefficients. The quantizer 1416 may perform quantization of transform coefficients output by the transform unit 1414. The quantizer 1416 may be a uniform or a non-uniform quantizer. The entropy coder 1418 may reduce bandwidth of the output of the coefficient quantizer by coding the output, for example, by variable length code words or using a context adaptive binary arithmetic coder.

The transform unit 1414 may operate in a variety of transform modes as determined by the controller 1470. For example, the transform unit 1414 may apply a discrete cosine transform (DCT), a discrete sine transform (DST), a Walsh-Hadamard transform, a Haar transform, a Daubechies wavelet transform, or the like. In an aspect, the controller 1470 may select a coding mode M to be applied by the transform unit 1415, may configure the transform unit 1415 accordingly and may signal the coding mode M in the coded video data, either expressly or impliedly.

The quantizer 1416 may operate according to a quantization parameter $Q_P$ that is supplied by the controller 1470. In an aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 1418, as its name implies, may perform entropy coding of data output from the quantizer 1416. For example, the entropy coder 1418 may perform run length coding, Huffman coding, Golomb coding, Context Adaptive Binary Arithmetic Coding, and the like.

The pixel block decoder 1420 may invert coding operations of the pixel block coder 1410. For example, the pixel block decoder 1420 may include a dequantizer 1422, an inverse transform unit 1424, and an adder 1426. The pixel block decoder 1420 may take its input data from an output of the quantizer 1416. Although permissible, the pixel block decoder 1420 need not perform entropy decoding of entropy-coded data since entropy coding is a lossless event. The dequantizer 1422 may invert operations of the quantizer 1416 of the pixel block coder 1410. The dequantizer 1422 may perform uniform or non-uniform de-quantization as specified by the decoded signal $Q_P$. Similarly, the inverse transform unit 1424 may invert operations of the transform unit 1414. The dequantizer 1422 and the inverse transform unit 1424 may use the same quantization parameters $Q_P$ and transform mode M as their counterparts in the pixel block coder 1410. Quantization operations likely will truncate data in various respects and, therefore, data recovered by the dequantizer 1422 likely will possess coding errors when compared to the data presented to the quantizer 1416 in the pixel block coder 1410.

The adder 1426 may invert operations performed by the subtractor 1412. It may receive the same prediction pixel block from the predictor 1460 that the subtractor 1412 used in generating residual signals. The adder 1426 may add the prediction pixel block to reconstructed residual values output by the inverse transform unit 1424 and may output reconstructed pixel block data.

The in-loop filter 1430 may perform various filtering operations on recovered pixel block data once it is assembled into frames. For example, the in-loop filter 1430 may include a deblocking filter 1432, a sample adaptive offset ("SAO") filter 1433, and/or other types of in loop filters (not shown). For example, the in-loop filter 1430 may perform adaptive loop filtering (ALF), maximum likelihood (ML) based filtering schemes, deringing, debanding, sharpening, resolution scaling, and the like.

The reference picture modification unit 1440 may create modified frames for storage in the reference picture buffer 1450. The reference picture modification unit 1440 may generate the modified frames according to any of the techniques described herein above.

The reference picture buffer 1450 may store modified frames for use in later prediction of other pixel blocks. And, as described above, the reference picture buffer 1450 also may store decoded frames in addition to modified frames.

Different types of prediction data are made available to the predictor 1460 for different prediction modes. For example, for an input pixel block, intra prediction takes a prediction reference from decoded data of the same frame in which the input pixel block is located. Thus, the reference picture buffer 1450 may store decoded pixel block data of each frame as it is coded. For the same input pixel block, inter prediction may take a prediction reference from previously coded and decoded frame(s) that are designated as reference frames. Thus, the reference picture buffer 1450 may store these decoded reference frames.

As discussed, the predictor 1460 may supply prediction blocks to the pixel block coder 1410 for use in generating residuals. The predictor 1460 may include an inter predictor 1462, an intra predictor 1463, and a mode decision unit 1464. The inter predictor 1462 may receive pixel block data representing a new pixel block to be coded and may search reference frame data from store 1450 for pixel block data from reference frame(s) for use in coding the input pixel block. The inter predictor 1462 may select prediction reference data that provides a closest match to the input pixel block being coded. The inter predictor 1462 may generate prediction reference metadata, such as reference picture identifier(s) and motion vector(s), to identify which portion(s) of which reference frames were selected as source(s) of prediction for the input pixel block.

The intra predictor 1463 may support Intra (I) mode coding. The intra predictor 1463 may search from among pixel block data from the same frame as the pixel block being coded that provides a closest match to the input pixel block. The intra predictor 1463 also may generate prediction mode indicators to identify which portion of the frame was selected as a source of prediction for the input pixel block.

The mode decision unit 1464 may select a final coding mode from the output of the inter-predictor 1462 and the inter-predictor 1463. The mode decision unit 1464 may output prediction data and the coding parameters (e.g., selection of reference frames, motion vectors and the like) for the selected mode. The prediction pixel block data may be output to the pixel block coder 1410 and pixel block decoder 1420. The coding parameters may be output to a controller 1470 for transmission to a channel. Typically, as described above, the mode decision unit 1464 will select a mode that achieves the lowest distortion when video is decoded given a target bitrate. Exceptions may arise when coding modes are selected to satisfy other policies to which the coding system 1400 adheres, such as satisfying a particular channel behavior, or supporting random access or data refresh policies.

In an aspect, multi-hypothesis coding may be employed, in which case operations of the inter predictor 1462, the intra predictor 1463 and the mode decision unit 1464 may be replicated for each of a plurality of coding hypotheses. The controller 1470 may control overall operation of the coding system 1400. The controller 1470 may select operational parameters for the pixel block coder 1410 and the predictor 1460 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 1480, which may include data representing those parameters in the data stream of coded video data output by the system 1400. The controller 1470 also may select between different modes of operation by which the system may generate reference images and may include metadata identifying the modes selected for each portion of coded data.

During operation, the controller 1470 may revise operational parameters of the quantizer 1416 and the transform unit 1415 at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 1470 may control operation of the in-loop filter 1450 and the prediction unit 1460. Such control may include, for the prediction unit 1460, mode selection (lambda, modes to be tested, search windows, distortion strategies, etc.), and, for the in-loop filter 1450, selection of filter parameters, reordering parameters, weighted prediction, etc.

Figure 15:
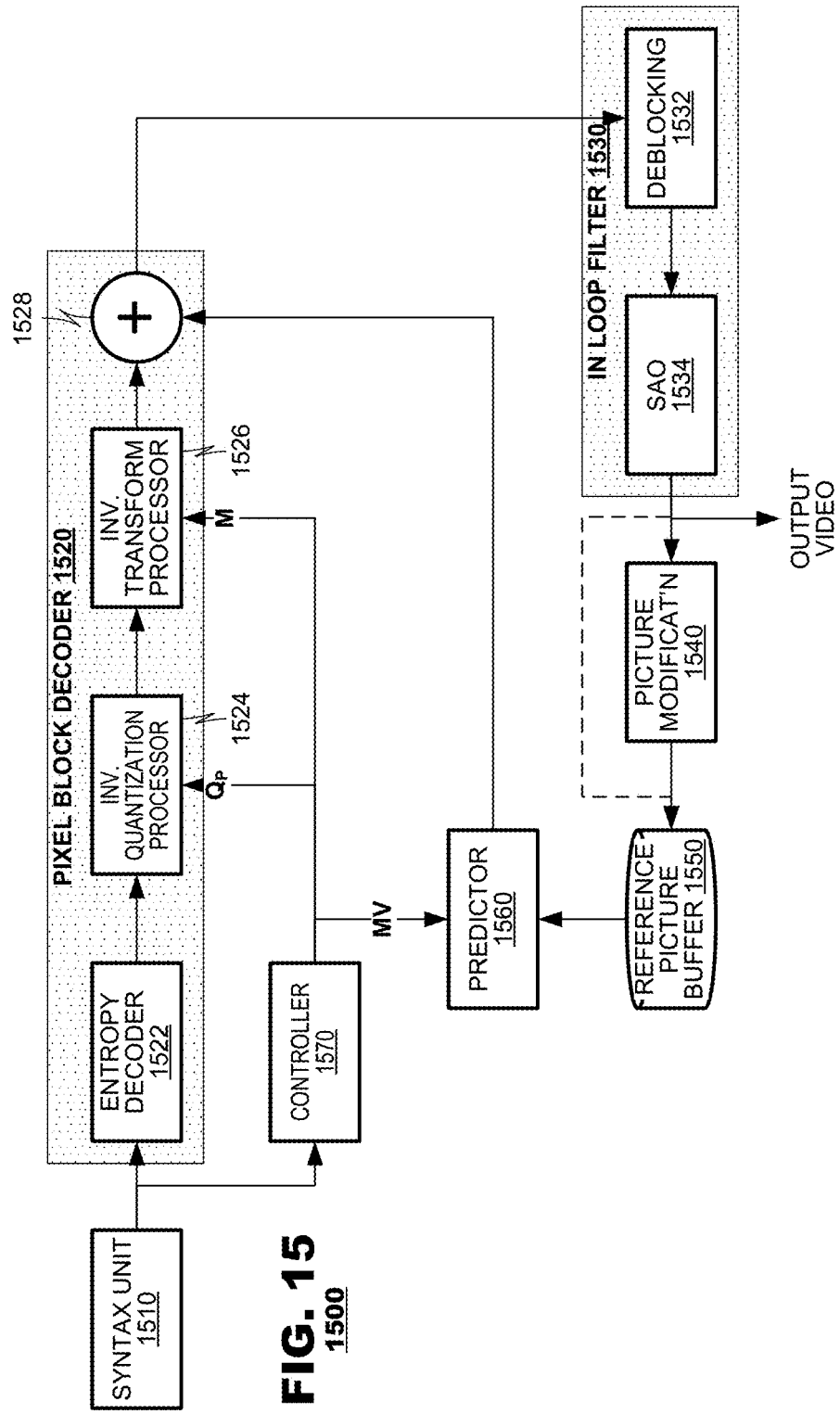
FIG. 15 is a functional block diagram of a decoding system according to an aspect of the present disclosure.

FIG. 15 is a functional block diagram of a decoding system 1500 according to an aspect of the present disclosure. The decoding system 1500 may include a syntax unit 1510, a pixel block decoder 1520, an in-loop filter 1530, a reference picture modification unit 1540, a reference picture buffer 1550, a predictor 1560, and a controller 1570.

The syntax unit 1510 may receive a coded video data stream and may parse the coded data into its constituent parts. Data representing coding parameters may be furnished to the controller 1570, while data representing coded residuals (the data output by the pixel block coder 1410 of FIG. 14) may be furnished to its respective pixel block decoder 1520. The predictor 1560 may generate a prediction block from reference data available in the reference picture buffer 1550 according to coding parameter data provided in the coded video data. It may supply the prediction block to the pixel block decoder 1520. The pixel block decoder 1520 may invert coding operations applied by the pixel block coder 1410 (FIG. 14). The in-loop filter 1530 may filter the reconstructed frame data. The filtered frames may be output from the decoding system 1500. Filtered frames that are designated to serve as reference frames also may be stored in the reference picture buffer 1550.

The pixel block decoder 1520 may include an entropy decoder 1522, a dequantizer 1524, an inverse transform unit 1526, and an adder 1528. The entropy decoder 1522 may perform entropy decoding to invert processes performed by the entropy coder 1418 (FIG. 14). The dequantizer 1524 may invert operations of the quantizer 1416 of the pixel block coder 1410 (FIG. 14). Similarly, the inverse transform unit 1526 may invert operations of the transform unit 1414 (FIG. 14). They may use the quantization parameters $Q_P$ and transform modes M that are provided in the coded video data stream. Because quantization is likely to truncate data, the pixel blocks recovered by the dequantizer 1524 likely will possess coding errors when compared to the input pixel blocks presented to the pixel block coder 1410 of the encoder (FIG. 14).

The adder 1528 may invert operations performed by the subtractor 1412 (FIG. 14). It may receive a prediction pixel block from the predictor 1560 as determined by prediction references in the coded video data stream. The adder 1528 may add the prediction pixel block to reconstructed residual values output by the inverse transform unit 1526 and may output reconstructed pixel block data.

The in-loop filter 1530 may perform various filtering operations on recovered pixel block data as identified by the coded video data. For example, the in-loop filter 1530 may include a deblocking filter, a sample adaptive offset ("SAO") filter, and/or other types of in loop filters. In this manner, operation of the in loop filter 1530 mimics operation of the counterpart in loop filter 1430 of the encoder 1400 (FIG. 14).

The reference picture buffer 1550 may store modified frames for use in later decoding of other pixel blocks. And, as described above, the reference picture buffer 1550 also may store decoded frames in addition to modified frames.

The reference picture buffer 1550 may store filtered frame data for use in later prediction of other pixel blocks. The reference picture buffer 1550 may store decoded frames as it is coded for use in intra prediction. The reference picture buffer 1550 also may store decoded reference frames.

As discussed, the predictor 1560 may supply the prediction blocks to the pixel block decoder 1520. The predictor 1560 may retrieve prediction data from the reference picture buffer 1550 represented in the coded video data.

The controller 1570 may control overall operation of the coding system 1500. The controller 1570 may set operational parameters for the pixel block decoder 1520 and the predictor 1560 based on parameters received in the coded video data stream. As is relevant to the present discussion, these operational parameters may include quantization parameters $Q_P$ for the dequantizer 1524 and transform modes M for the inverse transform unit 1510. As discussed, the received parameters may be set at various granularities of image data, for example, on a per pixel block basis, a per frame basis, a per slice basis, a per LCU/CTU basis, or based on other types of regions defined for the input image.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
partitioning a frame into a plurality of regions,
coding the regions for bandwidth compression, at least one region of the frame coded according to a gradual decoder refresh (GDR) technique, resulting in refreshing portion(s) of the frame,
transmitting to a channel a coded frame generated from the coding,
decoding the refreshed portion(s) of the frame,
generating a replacement content,
replacing non-refreshed portion(s) of the frame with the generated replacement content, and
storing a modified frame in a picture buffer, the modified frame is generated from the decoded refreshed portion(s) of the frame and the replaced non-refreshed portion(s) of the frame.

2. The method of claim 1, further comprising, during coding of another frame, performing a prediction search for content of the other frame using the modified frame as a candidate prediction reference.

3. The method of claim 1, wherein the replacement content is image content having a predetermined value.

4. The method of claim 1, wherein the replacement content is derived content for the portion coded by inter-coding techniques from content of the decoded I-coded portion.

5. The method of claim 1, wherein the replacement content is derived from a long-term reference frame.

6. The method of claim 1, wherein the replacement content is derived from an acknowledged reference frame.

7. The method of claim 1, wherein the replacement content is predicted from a neural network.

8. The method of claim 1, further comprising:
decoding the non-refresh portion(s) of the coded frame;
generating a decoded frame from the decoded refresh portion(s) and the decoded non-refresh portion(s) of the frame; and
storing the decoded frame in the picture buffer in association with the stored modified frame.

9. The method of claim 8, wherein the decoded frame and the modified frame are assigned separate reference index numbers.

10. The method of claim 8, wherein the decoded frame and the modified frame are stored as a composite reference frame and assigned a common reference index number.

11. A non-transitory computer readable medium storing program instructions that, when executed by a processing device, cause the device to execute a method, comprising:
partitioning a frame into a plurality of regions,
coding the regions for bandwidth compression, at least one region of the frame coded according to a gradual decoder refresh (GDR) technique, resulting in refreshing portion(s) of the frame,
transmitting to a channel a coded frame generated from the coding,
decoding the refreshed portion(s) of the frame,
generating a replacement content, replacing non-refreshed portion(s) of the frame with the generated replacement content, and storing a modified frame in a picture buffer, the modified frame is generated from the decoded refreshed portion(s) of the frame and the replaced non-refreshed portion(s) of the frame.

12. The medium of claim 11, further comprising, during coding of another frame, performing a prediction search for content of the other frame using the modified frame as a candidate prediction reference.

13. The medium of claim 11, wherein the replacement content is image content having a predetermined value.

14. The medium of claim 11, wherein the replacement content is derived content for the portion coded by inter-coding techniques from content of the decoded I-coded portion.

15. The medium of claim 11, wherein the replacement content is derived from a long-term reference frame.

16. The medium of claim 11, wherein the replacement content is derived from an acknowledged reference frame.

17. The medium of claim 11, wherein the replacement content is predicted from a neural network.

18. The medium of claim 11, further comprising:
decoding the non-refreshed portion(s) of the frame;
generating a decoded frame from the decoded refreshed portion(s) and the decoded non-refreshed portion(s) of the frame; and
storing the decoded frame in the picture buffer in association with the stored modified frame.

19. The medium of claim 18, wherein the decoded frame and the modified frame are assigned separate reference index numbers.

20. The medium of claim 18, wherein the decoded frame and the modified frame are stored as a composite reference frame and assigned a common reference index number.

21. A video coding system, comprising:
a video coder, having an input for frame data to be coded, an input for prediction data, and an output for coded video data, the video coder coding select frames according to a gradual decoder refresh (GDR) technique,
a transmitter having an input for the coded video data,
a video decoder, having an input for the coded video data and an output for decoded video data,
a frame modification unit, having an input for the decoded video data and an output for modified frame data, the modified frame data including, for a GDR coded frame, decoded refresh data and replacement content for non-refresh data,
a picture buffer to store the modified frame data.

22. A video decoding method, comprising:
decoding a coded frame received from a channel,
outputting the decoded frame;
identifying portion(s) of the decoded frame refreshed by a gradual decoder refresh (GDR technique,
generating replacement content,
replacing non-refreshed portion(s) of the decoded frame with the generated replacement content, and
storing a modified frame in a picture buffer, the modified frame is generated from the decoded refreshed portion(s) of the frame and the replaced non-refreshed portion(s) of the decoded frame.

23. The method of claim 22, further comprising, during decoding of another frame, retrieving a portion the modified frame as prediction data for decoding the other frame.

24. The method of claim 22, wherein the replacement content is image content having a predetermined value.

25. The method of claim 22, wherein the replacement content is derived content for the portion coded by inter-coding techniques from content of the decoded I-coded portion.

26. The method of claim 22, wherein the replacement content is derived from a long-term reference frame.

27. The method of claim 22, wherein the replacement content is derived from an acknowledged reference frame.

28. The method of claim 22, wherein the replacement content is predicted from a neural network.

29. The method of claim 22, further comprising storing the decoded frame in the picture buffer.

30. The method of claim 22, further comprising:
decoding the non-refreshed portion(s) of the frame;
generating a decoded frame from the decoded refreshed portion(s) and the decoded non-refreshed portion(s) of the frame; and
storing the decoded frame in the picture buffer in association with the modified frame.

31. The method of claim 30, wherein the decoded frame and the modified frame are assigned separate reference index numbers.

32. The method of claim 30, wherein the decoded frame and the modified frame buffered as a composite frame and assigned a common reference index number.

33. A non-transitory computer readable medium storing program instructions that, when executed by a processing device, cause the device to execute a method, comprising:
decoding a coded frame received from a channel,
outputting the decoded frame;
identifying portion(s) of the decoded frame refreshed by a gradual decoder refresh (GDR) technique,
generating replacement content,
replacing non-refreshed portion(s) of the decoded frame with the generated replacement content, and
storing a modified frame in a picture buffer, the modified frame is generated from the decoded refreshed portion(s) of the frame and the replaced non-refreshed portion(s) of the decoded frame.

34. The medium of claim 33, further comprising, during decoding of another frame, retrieving a portion the modified frame as prediction data for decoding the other frame.

35. The medium of claim 33, wherein the replacement content is image content having a predetermined value.

36. The medium of claim 33, wherein the replacement content is derived content for the portion coded by inter-coding techniques from content of the decoded I-coded portion.

37. The medium of claim 33, wherein the replacement content is derived from a long-term reference frame.

38. The medium of claim 33, wherein the replacement content is derived from an acknowledged reference frame.

39. The medium of claim 33, wherein the replacement content is predicted from a neural network.

40. A video decoding system, comprising:
a video decoder, having an input for coded video data and an output for decoded video data, the decoded video data comprise decoded frames including portion(s) refreshed by a gradual decoder refresh (GDR) technique,
a frame modification unit, having an input for the decoded video data and an output for modified frame data, the modified frame data are generated from refreshed portion(s) of the decoded frames and from generated replacement contents that replace the non-refreshed portion(s) of the decoded frames,
a picture buffer to store the modified frame data.

* * * * *